US011665245B2

(12) United States Patent
Yong et al.

(10) Patent No.: US 11,665,245 B2
(45) Date of Patent: *May 30, 2023

(54) PERSONALIZING USER EXPERIENCE IN A GAMING NETWORK

(71) Applicant: Sony Interactive Entertainment LLC, San Mateo, CA (US)

(72) Inventors: Stephen Yong, San Francisco, CA (US); Hu Peng, Orinda, CA (US); Stephanie Fok, San Francisco, CA (US); Khoi-Nguyen Duc Do, San Francisco, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/102,075

(22) Filed: Nov. 23, 2020

(65) Prior Publication Data

US 2021/0084114 A1 Mar. 18, 2021

Related U.S. Application Data

(63) Continuation of application No. 15/983,948, filed on May 18, 2018, now Pat. No. 10,848,592.

(51) Int. Cl.
*H04L 67/306* (2022.01)
*H04L 43/08* (2022.01)
*H04L 67/1097* (2022.01)

(52) U.S. Cl.
CPC .......... *H04L 67/306* (2013.01); *H04L 43/08* (2013.01); *H04L 67/1097* (2013.01)

(58) Field of Classification Search
CPC ... H04L 67/306; H04L 43/08; H04L 67/1097; H04L 67/131; A63F 13/63; A63F 13/69;
(Continued)

(56) References Cited

U.S. PATENT DOCUMENTS 10,848,592 B2 11/2020 Yong
2003/0110130 A1 6/2003 Pelletier
(Continued)

FOREIGN PATENT DOCUMENTS

CN 110507996 A 11/2019
WO WO 2019/221832 11/2019

OTHER PUBLICATIONS

PCT Application No. PCT/US2019/025441 International Preliminary Report on Patentability dated Nov. 24, 2020.
(Continued)

*Primary Examiner* — Benjamin M Thieu
(74) *Attorney, Agent, or Firm* — Polsinelli LLP

(57) ABSTRACT

The present disclosure describes methods and system for personalizing user experience in a gaming network. In particular, the user experience is personalized based on how users are characterized based on their interactions with the gaming network. By using the characterizations, the users are assigned labels that publicly identify the user experience, interest, and proficiency with various video games. Communities are then established based on users having the same labels. Lastly, user generated content can be characterized and promoted based on the characterizations to the appropriate communities.

21 Claims, 3 Drawing Sheets

(58) Field of Classification Search
CPC ...... A63F 13/798; A63F 13/795; A63F 13/60; A63F 13/71; A63F 13/79; A63F 2300/5546
See application file for complete search history.

(56) References Cited

U.S. PATENT DOCUMENTS

| | | |
|---|---|---|
| 2009/0089110 A1 | 4/2009 | Lara et al. |
| 2009/0089162 A1 | 4/2009 | Davis et al. |
| 2009/0113467 A1 | 4/2009 | Dupree |
| 2009/0132341 A1 | 5/2009 | Klinger et al. |
| 2009/0163183 A1 | 6/2009 | O'Donoghue et al. |
| 2013/0006709 A1 | 1/2013 | Kosta |
| 2013/0253934 A1 | 9/2013 | Parekh et al. |
| 2016/0048556 A1 | 2/2016 | Kelly et al. |
| 2017/0277790 A1* | 9/2017 | Alonso ................ G06F 16/31 |
| 2017/0364599 A1* | 12/2017 | Ohanyerenwa ......... G06F 16/48 |
| 2019/0356753 A1 | 11/2019 | Yong |

OTHER PUBLICATIONS

PCT Application No. PCT/US2019/025441 International Search Report and Written Opinion dated Jun. 24, 2019.
U.S. Appl. No. 15/983,948 Office action dated Nov. 1, 2019.

* cited by examiner

PERSONALIZING USER EXPERIENCE IN A GAMING NETWORK

CROSS-REFERENCE TO RELATED APPLICATION

The present application is a continuation and claims the priority benefit of U.S. patent application Ser. No. 15/983,948 filed May 18, 2018, now U.S. Pat. No. 10,848,592, which is incorporated herein by reference in its entirety.

BACKGROUND

Field of Invention

The present invention generally relates to gaming networks. More specifically, the present invention relates to personalizing user experience in a gaming network.

Description of the Related Art

In the past, video games may have been a single-user experience. With the increase in multi-player and online capabilities, users are increasingly becoming connected with other users. In many cases, communities of users interacting in gaming networks are being created although each of the users may be physically located far from each other. In this way, video games have become more social as players can find themselves as part of a network with other players who not only participate in the same game but whom also may share similar experiences and interests.

User-generated content centered on video games is a growing source of entertainment. Third party sites (such as Twitch.tv) hosts streamers who create live user generated content related to video games they are currently playing. Other sites provide other content creators the ability to upload their user generated content (such as screen shots, videos, or podcasts) so that others can consume via an on-demand basis. With the vast amounts of on-demand user-generated content that is available for user consumption, it can be daunting to figure out which user-generated content should be viewed. Some content may not be interesting or may be poorly produced. Furthermore, each user has their own interests with what content that user may want to consume—whether it be based on an interesting game or a preferred content creator.

There can be further improvements that not only connect users with other users who may share similar interests in the growing gaming networks but also provide these users with user generated content that the users would collectively be more interested in.

SUMMARY OF THE CLAIMED INVENTION

Embodiments of the present invention include methods for personalizing user experience in a gaming network. The method starts by receiving user information associated with the gaming network. The user information includes user gameplay information associated with one or more video games in connection with the gaming network. Based on the user information, the user is assigned one or more labels. These labels identify characteristics about the user. The labels are in turn used to assign the user to different communities that contain other users who share the same characteristics. User generated content is then characterized and assigned metadata that is used to identify the subject matter associated with the user generated content. The user generated content can then be promoted to various communities based on the association between the metadata and labels of the users. Based on the views and feedback related to the promoted user generated content reaching a pre-determined threshold, the content can be provided a status of being popular.

Embodiments of the present invention also include systems for personalizing user experience in a gaming network. The system includes video game servers that host video games associated with the gaming network. Furthermore, the system includes computing devices that are used by users to interact with the gaming network. The system also includes a gaming server that establishes the gaming network. The gaming network receives user information that includes gameplay information regarding one or more video games associated with the gaming network. The user information is used to assign one or more labels to the user. Using these labels, the user is then assigned to one or more communities that contain other users who share the same assigned labels. User generated content is characterized and assigned metadata that is used to identify the subject matter of the user generated content. The metadata is then used to promote the user generated content with certain communities. Based on the views and feedback related to the promoted user generated content reaching a pre-determined threshold, the content can be provided a status of being popular.

Embodiments of the present invention also include a non-transitory computer-readable storage medium having embodied thereon a program, the program being executable by a processor to perform a method for personalizing user experience in a gaming network. The method starts by receiving user information associated with the gaming network. The user information includes user gameplay information associated with one or more video games in connection with the gaming network. Based on the user information, the user is assigned one or more labels. These labels identify characteristics about the user. The labels are in turn used to assign the user to different communities that contain other users who share the same characteristics. User generated content is then characterized and assigned metadata that is used to identify the subject matter associated with the user generated content. The user generated content can then be promoted to various communities based on the association between the metadata and labels of the users. Based on the views and feedback related to the promoted user generated content reaching a pre-determined threshold, the content can be provided a status of being popular.

DETAILED DESCRIPTION

Figure 1:
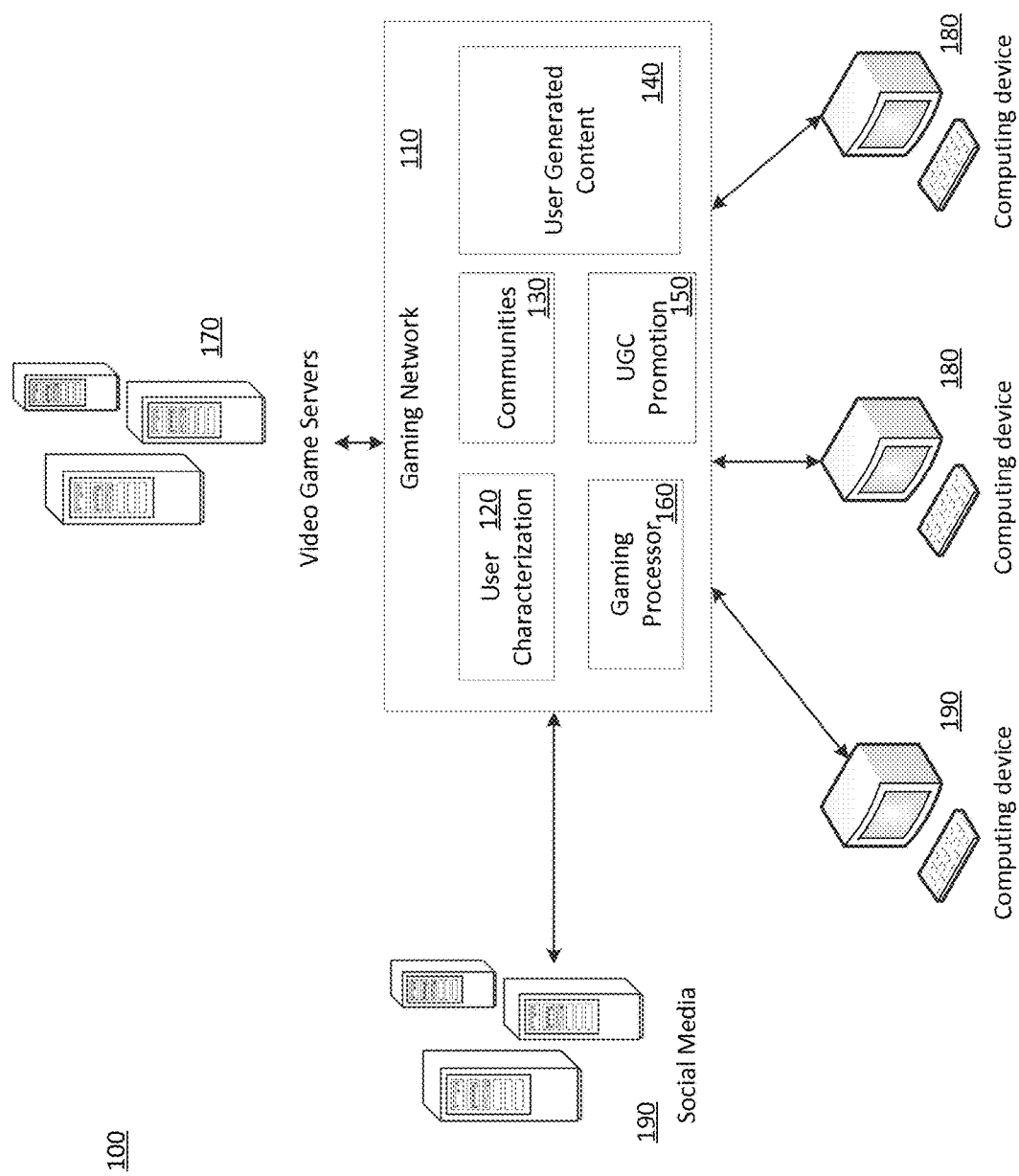
FIG. 1 illustrates a system for personalizing user experiences in a gaming network.

The present disclosure describes methods and systems directed at personalizing user experience in a gaming network. In particular, the user experience is personalized based on how users are characterized based on their interactions with the gaming network. By using the characterizations, the users are assigned labels that publicly identify the user experience, interest, and proficiency with various video games. Communities are then established based on users having the same labels. With gaming networks expanding to introduce social elements that allow users to connect with others while playing various video games, the present disclosure improves on the this sense of community by more effectively connecting users with others who share the same interest or experiences associated with the gaming network.

Furthermore, the method and systems would also promote particular user-generated content to specific users (or groups of users) in connection with the personalization of user experiences in the gaming network. Adjustments can be made to where user generated content is promoted based on views and feedback. Furthermore identification of user generated content that is popular or trending can also be determined.

As described herein, user-generated content pertains to content created and shared by one or more users associated with the gaming network. User generated content can include blog posts, videos, audio, and screen shots that relate to one or more video games associated with the gaming network. User may create the content for many different reasons such as sharing their interest and experiences with others. For example, a user can document (in a video recording) the user's experience of an event within a video game. The documentation can be then shared with other users for many different reasons such as: 1) to promote the game to other users, 2) to promote the user and their expertise in the game, and 3) to inform other users how to overcome the event.

With the vast amount of user-generated content available on various sites (e.g. Twitch, Youtube), it is a challenge to promote certain content to the specific users who would be most interested in it. Viewing users may be provided content unrelated or uninteresting thereby providing little to no impact the user-generated content can have. Furthermore, content creators may drown each other out from the sheer number of user-generated content that is created for popular games or topics. Viewing users, at a glance, may be unable to distinguish between good content and bad content.

In order to personalize user experience in the gaming network and promote user-generated content, the present disclosure describes a gaming network and associated features useful for characterizing users and user-generated content. In particular, users can be assigned various labels that identify characteristics (e.g. interests, achievements, experiences, skills) about the users that he/she would like to be known. These characteristics can then be used to associate the users with other users who share the same characteristics. The use of the shared characteristics is the starting point for communities (or clusters) of users that users can connect with while on the gaming network.

Furthermore, with the known communities (or clusters) of users, specific user-generated content can then be characterized. Metadata can be assigned to the user-generated content identifying the subject matter of the content. This metadata is used to identify communities (or clusters) who may be interested in viewing this content. Furthermore, user-generated content can also be promoted and made popular based on the views and reactions to the content.

FIG. 1 illustrates a system 100 for personalizing user experience in a gaming network. The figure illustrates some elements—but should not be interpreted as being exclusively all possible elements that could be compatible—directed at facilitating personalization of user experiences in a gaming network. Details about each of the illustrated elements will be provided below in further detail.

The system 100 includes a gaming network 110 that is used to manage the user interactions in connection with video games and user generated content associated with the video games. For example, many video games may have multiplayer and/or online features. The gaming network 110 can connect users (each on their respective computing device 180) and direct them to the corresponding video game servers 170 where their participation in the video game can be carried out. User generated content can be created and stored on the gaming network 110 although other content can also be created and stored on social media websites associated with the social media servers 190. Since the gaming network 110 is also communicatively connected to these social media servers 190, this allows the gaming network 110 to not only be able to retrieve user-generated content and related information about that content that can be used to share the content with different users but also allows the gaming network 110 to promote user generated content to others (even those not connected to the gaming network) by using social media (e.g. generating posts for social media websites) via the social media servers 190.

The gaming network 110 may be associated with and maintained by first parties—entities that are associated with a particular platform used by users to participate in platform-specific video games on the gaming network. Other parties (e.g. third parties) may also have their own separate gaming networks used in connection with their games. While there may be many different gaming networks 110 each associated with their respective video games, there may also be an embodiment where an overarching gaming network can encompass each and every distinct gaming network. The overarching gaming network could be used to facilitate user interactions even with other users across different parties or platforms.

The gaming networks 110 themselves include a variety of different features that facilitate the personalization of user experience in the gaming network. In particular, the gaming networks 110 includes features directed at characterizing users via the creation and maintenance of labels 120, organize users within communities (or clusters) 130, generating and storing user-generated content 140, promoting user generated content 150, and managing the operation of the video games 160 associated with the gaming network 110. The details regarding what each feature of the gaming network 110 will be described further below.

The user characterization module 120 is used to characterize user behavior with respect to video games and subsequently label the user accordingly. The steps of characterizing and labeling users by the user characterization module 120 is generally performed by analyzing information about the user, identifying notable characteristics that can be associated with the user, and assigning labels to the user corresponding to the identified characteristics.

Information about the user that can be analyzed by the user characterization module 120 mainly revolves around user gameplay data. The gameplay data may be captured by the video game servers 170 as the user participates in the video game. Upon request from the user characterization module 120, the video game servers 170 can transmit the related gameplay information for analyzing. From the gameplay information obtained from the video game servers 170, the user characterization module 120 is able to detect relevant pieces of information that can be used to identify characteristics of significance for each user. For example, information such as what games the user is currently playing, how long the user has been playing that game, how far the user is within that game, and how the user is playing the game (e.g. proficiency, role) can all be obtained from user gameplay data. This information can then be used, for example, to identify the type of games the user is interested in playing at the time, how the user generally approaches the game, and whether the user is experienced or experienced in those types of games.

Additional information that can also be used by the user characterization module 120 can include user provided information. For example, in order to utilize the gaming network 110, users may need to establish an authenticated user account. From this user account, users may provide information about themselves (as a part of a user profile, surveys, or other questionnaires) that include user preferences and other assertions by the user (e.g. identifying the user's favorite games or games previously played). This user information could also be used to identify the existence of characteristics that correspond to labels that could be assigned to the user.

Furthermore, users can also choose to identify or link a social media profile to their user account associated with the gaming network 110. The user characterization module 120, when provided the user's social media, can proceed with scanning the user's social media to identify any relevant information used to characterize the user. For example, user activity such as viewing content or providing feedback about certain games can at least be used to identify interest with a particular video game or genre of games. The user characterization module 120 is thus able to retrieve related information from the user's social media and activity on social media to further identify other characteristics that can be associated with labels.

The user characterization module 120 may choose to consider any number of different sources of user-related information (e.g. gameplay information, surveys, social media) to identify characteristics and assign labels for the user. Different sources may be weighted differently or provided different prioritization based on the community that is being built. For example, the gaming network 110 may consider using gameplay information about the user as being more significant when creating a community of users who share an interest in playing a specific video game on a competitive level. In contrast, a community of users who share an interest in playing a specific video game on a casual level may have more emphasis on user provided information and/or social media.

Exemplary characteristics that may be identified from user-related information may include identifying video games the user is currently playing or interested in, the type/genre of games the user enjoys playing, user specific habits and behavior (e.g. when the user plays, for how long, roles within the games), and user experiences (e.g. achievements, skills). Each of these characteristics may be assigned a different standardized label established, for example, by the gaming network 110. It may be possible, however, to have third parties or other users introduce additional labels if the existing labels do not cover a particular characteristic (e.g. new video games, new groups).

With each of the labels, underlying details can be included that emphasize the type of user information to look for so that the user can be associated with the correct label. For example, a label indicating that the user enjoys playing a certain genre of video games may include looking for a pre-determined number of different titles associated with the genre, total amount of game time playing video games of that genre, user proficiency with respect to playing video games of that genre, and user preferences stated in the user profiles, surveys or social media. These underlying details can be viewed as factors regarding the types of collected user information that could be identified and used to support assigning the label to the user.

Furthermore, these factors may have thresholds identifying the significance of the related information that would need to be present before being considered for the label. For example, there may need to be gameplay information about the user playing at least 5 different sports games, or having a total playtime of over 100 hours in any number of different sports games before a label associating the user as a sports game player can be used.

In an alternative embodiment, the same factors can be evaluated and different thresholds can be assigned useful for identifying the type of label that the user should be associated with. For example, a label can be used to correspond to the user's proficiency in sport-related video games as being casual, average, or competitive. The information that is evaluated may include the number of different sports video games, the amount of time the user plays sports video games, and proficiency in those games (e.g. trophies, achievements). Different thresholds can be assigned for casual, average, or competitive players for each of the different information being evaluated. For example, casual players may constitute play time of between 0-50, average playtime is between 51-100, and competitive is 101 and over.

Further embodiments may evaluate user eligibility with certain labels on a regular basis. For example, users who have a competitive label for a particular game may need to at least maintain a proficiency level (e.g. rank) within the video game or play the video game a pre-determined amount of time within a period of time. So long as the pre-requisite is maintained, the user can keep the corresponding label. However, if the user's eligibility lapses, the user may be provided the different (more appropriate) label. This different label can then affect the user's assignment to different communities on the gaming network 110 as well.

Once achieved, the labels can be associated with the user and subsequently used (by the communities module 130) to group the users with others who share similar characteristics. In this way, the gaming network can evaluate and provide improved personalization of the user experience in the gaming network by having another way to check the validity of users who identify with particular characteristics.

The communities module 130 can generate, group, and maintain different communities (or clusters) of users each having similar labels (provided by the user characterization module 120). The aim for the communities module 130 is to identify a group of users who all share similar interest, experiences, and/or proficiency with various video games or topics associated with the gaming network 110. There are countless users each who have their own interests, playstyles, and experiences. Even though users may enjoy playing games by themselves or with friends, being able to connect users with potentially many other users who also enjoy the same thing could enhance the user experience playing in certain online or multiplayer games. Furthermore, the ability to communicate with other users and share user generated content about the same topics of interest also support the aim of fostering a more enjoyable user experience.

Once various labels have been assigned to the user via the user characterization module 120, the communities module 130 analyzes the labels and proposes any number of different communities that the user could be part of. Each community may have a variety of different labels associated with it and membership to the community may require that the user is assigned those same labels. When provided the possible communities to join, the user at this point can choose to join or deny membership to any of the communities. Because it can be daunting for a user to connect with unknown users associated with the gaming network 110, the communities module 130 aims to automatically connect the user to other users who all share similar characteristics.

Although some communities may require the user to have some labels before being assigned to them, other communities are open to everyone. The purpose of the labels, therefore, is to inform the user regarding what the community is about and therefore useful as an indicator regarding whether the community would be a good fit with the user.

As described herein, communities (or clusters) of users are associated with one or more labels that are used to identify users who share this characteristic. For example, a community can include all users who are interested in sport video games, and maybe even more specifically those users who are interested in basketball video games. The communities, in being assigned labels to identify particular characteristics, can be a place in the gaming network 110 where users can network and interact with other users who all share the same characteristic (e.g. interest, experience).

These communities, established by the communities module 130, allow users who share similar labels to more easily communicate and network with other users who play the same video games, play the same type of games, or even approach the video game in a similar manner. Communities allow users to connect and socialize (for example via a chat service associated with the gaming network 110) with other users who are also similar to them. In situations where a user may not have teammates, communities can also facilitate matching users with other potential users (via the gaming processor 160) for multiplayer games.

As described above, membership to communities may be restricted to users who have certain labels. The gaming network may evaluate the labels assigned to the user to ensure that the user satisfies the requirements for membership with the community. In some cases, as some labels are added or removed from the user, the user's membership eligibility with a community can also change with time. It may be of interest to also update the user's eligibility related to membership to certain communities (e.g. users who are part of the competitive sport video game players community are currently competitive). However, there may also be some communities that only require that the user have the label at one point and would thus be eligible for the community even if the label no longer is applicable (e.g. users who previously played a particular video game but no longer play that game). Much for the same reason to ensure that the labels properly reflect the user characteristics, the updating of the membership of the communities can ensure that users are grouped with other users who share the similar interest. For example, users who may at one point be casual players but transitioned to competitive players may be moved to the appropriate community. If the user decides that playing the game competitively is no longer appropriate and wants to just play the game casually again, the user can then be moved back to the casual group.

The significance of the grouping within the communities is also because communities can be used as a way to provide user generated content specific to those users that could find that content interesting. Since there may be any number of different users associated with the gaming network 110 and each of those users may be interested in different games, it would be difficult to correctly identify for each user the type of user-generated content each user would be interested in on an individual basis. However with communities, the labels can be compared with metadata associated with the user generated content to identify where the user generated content can be promoted. For example, user generated content based on sports video games would be more interesting to users within the sports game community while user generated content based on adventure games would be more interesting to users within the adventure game community. Furthermore, the types of user generated content can also directed based on the community and their potential interest in the content. For example, user-generated content such as screenshots and walkthroughs of a video game may be better received by a casual community while user-generated content for tournaments (e.g. multiplayer gameplay) may be more well received by a more competitive community.

The user generated content module 140 facilitates user creation and labeling of user generated content. As described herein, user generated content can consist of any number of different content that can be created and shared by the user. Such content includes screen shots, audio recordings (e.g. podcasts), video recordings, live-streams, and text (e.g. blog posts) associated with video games. The user generated content module 140 can provide an interface associated with the gaming network 110 that allows the user to create, upload, and store the user generated content on the gaming network 110.

Once created, the user generated content module 140 can also identify related metadata and assign the metadata to the user generated content. Exemplary metadata associated with the user generated content may include the identity of the content creator, the video game title, the location within the video game, the characters within the user generated content, and the event being covered in the user generated content. Information used to assign the metadata may include the actual gameplay data itself. It may also be possible to utilize other technologies, such as computer vision, to analyze the substance of what is being illustrated in the user generated content to properly identify what metadata to assign.

The content creator may also be able to submit customized metadata for the user generated content. Since the user submitted metadata may not be standardized between different content creators, the user generated content module 140 can aim to synchronize the meaning of the user submitted metadata into pre-determined terms. For example, metadata identifying an "expert play", "sick play", "kill streak", etc. . . . could all be associated with a competitive metadata. This association between different user submitted metadata and predetermined terms to be associated as metadata with the user generated content can be established manually at first. However, the user generated content module 140 may also include artificial intelligence programming that learns the various user provided terminology and assigns the corresponding metadata. In situations where the wrong metadata is provided (e.g. "cool move" is initially identified with a competitive metadata), user feedback indicating that the user generated content does not correspond to the corresponding label can be used to modify the artificial intelligence for assigning subsequent metadata.

The user-generated content promotion module 150 facilitates the gaming network 110 in promoting the user generated content to other users—especially users who are part of various communities (or clusters). Furthermore, the user-generated content promotion module 150 can also facilitate promoting the user-generated content outside of the gaming network 110, for example, with social media 190 or other websites (e.g. Youtube, Twitch).

The user generated content promotion module 150 facilitates providing the user generated content to corresponding communities (or clusters) that have labels that coincide with the metadata assigned with the user generated content. This is based on the assumption that users enjoy user-generated content that they also have a current interest in. Thus to best promote user generated content, the user generated content promotion module 150 uses the metadata of the user generated content and promotes the user generated content to the corresponding communities.

The user generated content promotion module 150, after promoting the user generated content to a community can monitor user views and feedback related to the user generated content. The views and feedback can be used to gauge, for example, whether the user generated content is well received, interesting, or relevant to that community. Based on the feedback, the user generated content promotion module 150 could adjust what types of content can be provided to the community. Feedback can also be provided to the user generated content module 140 with respect to how content can be labeled.

At a certain point, user generated content having a certain number of views and/or feedback can be identified as trending or popular. At this point, the user generated content promotion module 150 could place this content on a separate list that is used to identify all different types of user generated content that have each been received as being trending/popular for a particular segment of users within the gaming network 110. The user generated content promotion module 150 can use this list of trending/popular user generated content to rank and promote the user generated content for other users in other communities in the gaming network 110. Further monitoring of views and feedback from the larger audience of users within the gaming network 110 can adjust the ranking and promotion.

The list of trending/popular user generated content can also be used by the user generated content promotion module 150 to suggest content to various users who may not be part of any community. At the very least, the trending and popular user generated content can be used to inform users about existing video games and communities on the gaming network 110. Furthermore, the list of trending/popular user generated content may also be used to suggest/promote user generated content even to unrelated communities (e.g. promoting content purely on a popularity standpoint and not based on labels/metadata association).

The list of trending/popular user generated content can also be used for monetization purposes. Knowing that certain user generated content is popular may inform which user generated content may be worthwhile to incorporate advertisements in. This can incentivize content creators of user generated content to create more content but also better quality content that users can enjoy consuming.

The user generated content promotion module 150 can also facilitate promoting user generated content by providing the user generated content to social media servers 190. In some cases, the user generated content can be provided a corresponding hashtag that corresponds to the various metadata associated with the user generated data. Hashtags are generally used to visibly promote user generated content for others to view. Other users, when viewing the user generated content can use that same hashtag to promote the content further or associate other user generated content with the original content associated with the hashtag. Therefore, the more the hashtag is shared, the more visibility (e.g. views and feedback) the user generated content may receive.

Although hashtags may be customized by the user, there is a possibility that the user assigned hashtags may differ although user generated content may relate to the same subject matter. Thus the user generated content promotion module 150 may be used to modify or even automatically assign terms to the hashtag that correspond to the metadata.

Furthermore, it may be possible for the user generated content promotion module 150 to suggest hashtags for consolidating similar user generated content. For example, if two or more different hashtags are used to reference similar content (e.g. the same video game event), the visibility for each of the similar content may be split. The user generated content promotion module 150 can identify possible user generated content that are similar using a variety of methods such as looking at the metadata, gameplay data or utilizing machine vision to analyze images associated with the user generated content. In this way, user generated content provided from different view points or slightly different locations can be all linked together.

Although the user generated content is about the same subject matter, the subject matter does not become popular/trending because not enough views or feedback is received—the views/feedback is split among different user generated content. In this way, the user generated content promotion module 150 may suggest an overarching term that can be used to more generally describe the user generated content identified to be similar. Each of the different hashtags can then be associated with the overarching term. Now when other users view and reference the new overarching hashtag, all the other user generated content can be associated with the new term. Users would then be able to view each similar user generated content within that overarching term. In some cases, a ranking within the user generated content can also be used to suggest from among the similar user generated content that is the most popular, for example, based on views and feedback.

By using social media and hashtags, the user generated content can be promoted to users outside of the gaming network 110 via different social media sources. User views and feedback from the social media sources can then be monitored and retrieved by the user generated content promotion module 150 to update the user generated content's popularity and trending status within the gaming network 110.

The gaming processor 160 manages user connection with other users on the gaming network 110. This includes obtaining necessary information from the video game servers 170 to facilitate the online and/or multiplayer features associated with the games the users are participating in. The instances of the video game could be run on the gaming network 110. However, the gaming processor 160 can also direct the users to the appropriate game servers 170 and have the game servers 170 host the online and/or multiplayer instances that the users participate in.

There may be many different video game servers 170 each associated with a corresponding different video game compatible with the gaming network 110. A particular video game server 170, for example, may have all the information needed to initiate and manage instances of a video game that users participate via the online and multi-player features of those video games. It may also be possible that the gaming network 110 can initiate and manage the instances of the video by obtaining information from the video game server 170.

The computing devices 180 are used by the users to connect with the gaming network 110 and participate in the various video games hosted by the video game servers 170.

Details about the features of the computing device 180 illustrated in the figure are provided in further detail below in FIG. 2

Figure 2:
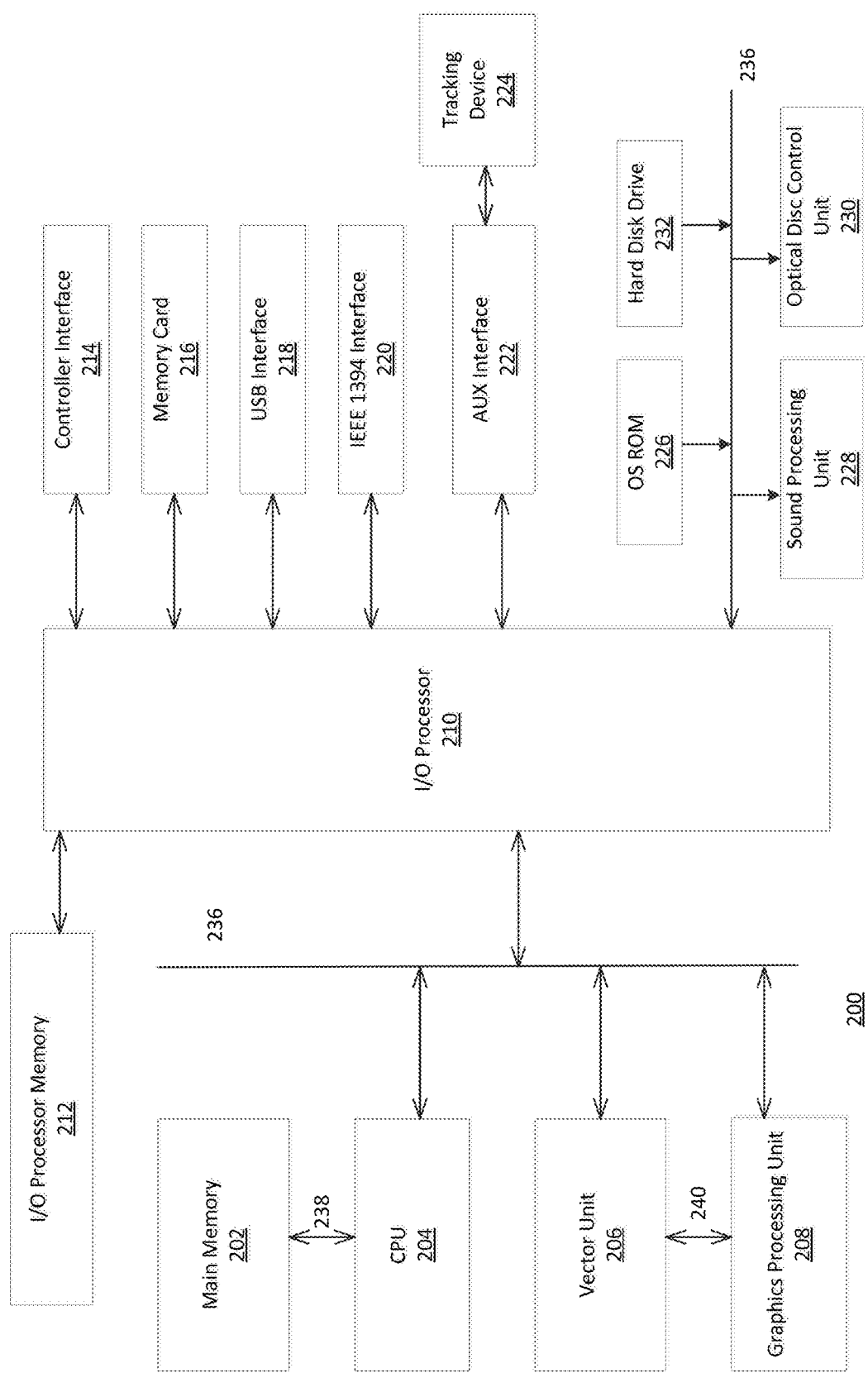
FIG. 2 is an example computing device used in context of the system for personalizing user experiences of FIG. 1.

FIG. 2 is an example computing device 200 used in context of the system for personalizing user experience in the gaming network of FIG. 1. The computing device 200 (which in some cases may also include other types of computing devices such as desktops, laptops, tablets, gaming console, and mobile devices) is a device that users can utilize in order to participate with the gaming network as illustrated in FIG. 1.

The computing device 200 may include various elements as illustrated in FIG. 2, however, it should be noted that the elements are exemplary and that other embodiments may incorporate more or less than the elements illustrated. With reference to FIG. 2, the computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The computing device 200 further includes an operating system read-only memory (OS ROM) 226, a sound processing unit 228, an optical disc control unit 230, and a hard disc drive 232, which are connected via a bus 234 to the I/O processor 210. The computing device 200 includes at least one tracking device 224.

The tracking device 224 may be a camera, which includes eye-tracking capabilities. The camera may be integrated into or attached as a peripheral device to the computing device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to computing device 200 that captures voice data. The microphone may conduct acoustic source localization and/or ambient noise suppression. The microphones may be usable to receive verbal instructions from the user to schedule, retrieve and display content on the computing device 200.

Alternatively, tracking device 224 may be the controller of the computing device 200. The controller may use a combination of built-in accelerometers and infrared detection to sense its position in 3D space when pointed at the LEDs in a sensor nearby, attached to, or integrated into the console of the entertainment system. This design allows users to control functionalities of the computing device 200 with physical gestures as well as button-presses. The controller connects to the computing device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the computing device 200 instead can be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the computing device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the computing device 200 provides instructions via the controller interface 214 to the CPU 204. For example, the user may instruct the CPU 204 to store certain information on the memory card 216 or instruct the computing device 200 to perform some specified action. Example controllers associated with the controller interface 214 may include a touch-screen, keyboards and game controllers.

Other devices may be connected to the computing device 200 via the USB interface 218, the IEEE 1394 interface 220, and the AUX interface 222. Specifically, a tracking device 224, including a camera or a sensor may be connected to the computing device 200 via the AUX interface 222, while a controller may be connected via the USB interface 218.

Figure 3:
FIG. 3 is a method for personalizing user experiences in a gaming network.

FIG. 3 is a method 300 for personalizing the user experience in the gaming network. By characterizing and labeling each users, communities of users can be formed who all share similar interests and experiences in various video games associated with the gaming network. Furthermore, user generated content, created with the gaming network, can also be assigned metadata accordingly so that the user generated content can be promoted to the appropriate communities. As the user generated content becomes more popular (or trends) based on views and feedback from the initial community promotions, the user generated content can then be promoted to other users outside the initial proposed community.

In step 310, the gaming network retrieves user-related information. Gameplay information, user provided information, and user social media information can all be obtained and analyzed to identify the types of characteristics the user may have with respect to various video games associated with the gaming network. Different weights may be assigned to the different sources based on the importance of certain characteristics.

In step 320, the gaming network assigns labels to the users. Labels are used to identify the characteristics associated with the user. Each label has a corresponding characteristic that has been identified from the use-related information.

Some labels may require a pre-determined threshold before being able to assign the label to the user. For example, a competitive label may require the user perform at a certain proficiency within the game. Furthermore, user labels can be updated and modified on a regular basis to ensure that the current characterizations for the user are up-to-date.

In step 330, the gaming network assigns users to different communities. The accuracy of the labels is important because the labels are used to propose which communities the user should become part of. Some communities may be associated with a variety of different labels and joining those communities may require the user to have a pre-requisite number of those labels. Other communities may only require at least one label while others only provide labels as a suggestion identifying the type of users the user would be interacting with. With the feature of communities on the gaming network, users are able to join any number of different communities and in turn be able to connect with different users who potentially share the same interest, experience, or expertise with video games.

In step 340, the gaming network assigns metadata to characterize user generated content. User generated content can be generated on the gaming network. However, user generated content can also be retrieved from other sources (e.g. uploaded onto social media servers such as Youtube). When the gaming network receives user generated content to be promoted to users, the gaming network first characterizes the user generated content. The characterization is needed so that the gaming network can identify relevant groups of users who may be interested in viewing the user generated content.

By analyzing the contents of the user generated content (e.g. the gameplay data), metadata can be assigned to the user generated content that seeks to summarize the subject matter of the content. The metadata can similar to or at least correspond to labels used to identify characteristics of the users associated with the gaming network. By using the metadata, user generated content can be matched with various users and communities in hopes of providing the content to users who would most likely find the content interesting.

In step 350, the gaming network promotes user generated content to the communities based on the metadata. There may be a pre-defined correlation between different metadata and labels. Once the user generated content is provided to the communities for viewing, the gaming network can monitor the views and feedback from the users whom the user generated content was promoted to in order to identify whether the content should be deemed popular/trending.

The views and feedback can also be used to adjust associations between the metadata assigned to the user generated content and the users or communities having particular labels that may find the content interesting. For example, if a particular association between metadata and labels yields a consistently low view count or has negative feedback, this may be indicative that the content is not popular with users who share that label. Other labels and communities can then be explored to find a more appropriate matching.

In step 360, the gaming network monitors the user generated content for popularity and trending status. Once views and feedback for user generated content reaches a pre-determined threshold, the gaming network can identify such content as being popular or trending. At this point, the user generated content can be stored on a list with other popular and trending content. This list can be used, in step 370, by the gaming network to promote these specific user generated content with other users outside of the initial community. In some cases, the user generated content can be posted on social media (via transmissions to the social media server) so that users outside of the gaming network can view the user generated content. Based on the monitored views and feedback, the gaming network can gauge the popularity and trending status of the user generated content.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for customizing metadata for user-generated content, the method comprising:
   receiving user-submitted metadata associated with a user-generated content file, the user-submitted metadata received over a communication network;
   synchronizing one or more terms of the user-submitted metadata to a set of pre-determined terms, wherein the synchronized terms of the user-submitted metadata are identified as being associated with one or more of the pre-determined terms;
   assigning new metadata to the user-generated content file, the new metadata corresponding to the identified pre-determined terms;
   updating the new metadata based on user feedback, wherein the user feedback indicates an adjustment to a relationship between the user-generated content file and the new metadata; and
   generating one or more hashtags based on the updated new metadata and adjusted relationship, wherein the generated hashtags are associated with the user-generated content file.

2. The method of claim 1, wherein synchronizing the terms of the user-submitted metadata to the pre-determined terms is based on an association learned by artificial intelligence programming, wherein the artificial intelligence programming is updatable based on the user feedback.

3. The method of claim 1, wherein synchronizing the terms of the user-submitted metadata to the pre-determined terms is based on a previously established association between the user-submitted metadata and one of the pre-determined terms.

4. The method of claim 1, wherein synchronizing the terms of the user-submitted metadata to the pre-determined terms is based on identifying that the user-generated content file includes one or more similar characteristics as another user-generated content file associated with the pre-determined terms.

5. The method of claim 4, wherein identifying that the user-generated content file includes the similar characteristics as the other user-generated content file is based on gameplay data associated with the user-generated content file exhibiting characteristics in common with gameplay data of the other user-generated content file.

6. The method of claim 4, wherein identifying that the user-generated content file includes the similar characteristics as the other user-generated content file is based on utilizing computer vision to analyze displayed content of the user-generated content file.

7. The method of claim 1, wherein one of the pre-determined terms is associated with a plurality of terms of the user-submitted metadata.

8. The method of claim 1, further comprising assigning metadata to a subsequent user-generated content file based on the user feedback.

9. The method of claim 1, further comprising transmitting the generated hashtags of the user-generated content file over the communication network to one or more online communities.

10. The method of claim 9, wherein the generated hashtags are transmitted to the online communities associated with a same label as a user of the user-generated content file.

11. A system for customizing metadata for user-generated content, the system comprising:
a communication interface that communications over a communication network to receive user-submitted metadata associated with a user-generated content file, the user-submitted metadata received over a communication network; and
a processor that executes instructions stored in memory, wherein the processor executes the instructions to:
synchronize one or more terms of the user-submitted metadata to a set of pre-determined terms, wherein the synchronized terms of the user-submitted metadata are identified as being associated with one or more of the pre-determined terms;
assign new metadata to the user-generated content file, the new metadata corresponding to the identified pre-determined terms;
update the new metadata based on user feedback, wherein the user feedback indicates an adjustment to a relationship between the user-generated content file and the new metadata; and
generate one or more hashtags based on the updated new metadata and adjusted relationship, wherein the generated hashtags are associated with the user-generated content file.

12. The system of claim 11, wherein the processor executes instructions to synchronize the terms of the user-submitted metadata to the pre-determined terms based on an association learned by artificial intelligence programming, wherein the artificial intelligence programming is updatable based on the user feedback.

13. The system of claim 11, wherein the processor executes instructions to synchronize the terms of the user-submitted metadata to the pre-determined terms based on a previously established association between the user-submitted metadata and one of the pre-determined terms.

14. The system of claim 11, wherein the processor executes instructions to synchronize the terms of the user-submitted metadata to the pre-determined terms by identifying that the user-generated content file includes one or more similar characteristics as another user-generated content file associated with the pre-determined terms.

15. The system of claim 14, wherein the processor executes instructions to identify that the user-generated content file includes the similar characteristics as the other user-generated content file based on gameplay data associated with the user-generated content file exhibiting characteristics in common with gameplay data of the other user-generated content file.

16. The system of claim 14, wherein the processor executes instructions to identify that the user-generated content file includes the similar characteristics as the other user-generated content file based on utilizing computer vision to analyze displayed content of the user-generated content file.

17. The system of claim 11, wherein one of the pre-determined terms is associated with a plurality of terms of the user-submitted metadata.

18. The system of claim 11, wherein the processor executes further instructions to assign metadata to a subsequent user-generated content file based on the user feedback.

19. The system of claim 11, wherein the communication interface transmits the generated hashtags of the user-generated content file over the communication network to a plurality of online communities.

20. The system of claim 19, wherein the communication interface transmits the generated hashtags of the user-generated content file over the communication network to the online communities associated with a same label as a user of the user-generated content file.

21. A non-transitory computer-readable storage medium having embodied thereon a program, the program being executable by a processor to perform a method for customizing metadata for user-generated content, the method comprising:
receiving user-submitted metadata associated with a user-generated content file, the user-submitted metadata received over a communication network;
synchronizing one or more terms of the user-submitted metadata to a set of pre-determined terms, wherein the synchronized terms of the user-submitted metadata are identified as being associated with one or more of the pre-determined terms;
assigning new metadata to the user-generated content file, the new metadata corresponding to the identified pre-determined terms;
updating the new metadata based on user feedback, wherein the user feedback indicates an adjustment to a relationship between the user-generated content file and the new metadata; and
generating one or more hashtags based on the updated new metadata and adjusted relationship, wherein the generated hashtags are associated with the user-generated content file.

* * * * *